June 30, 1970 — L. C. DE CROES — 3,517,453
BAIT BUCKET
Filed Jan. 19, 1968
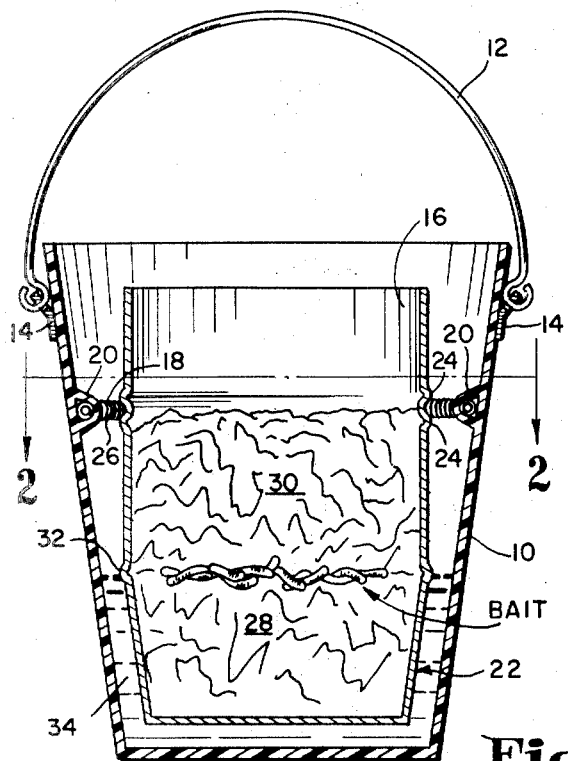
Fig. 1
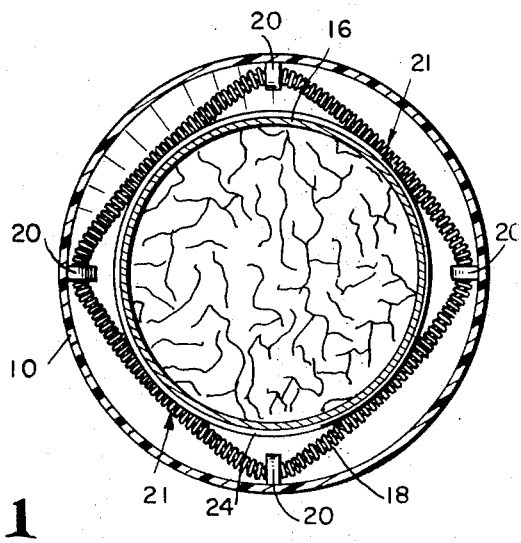
Fig. 2
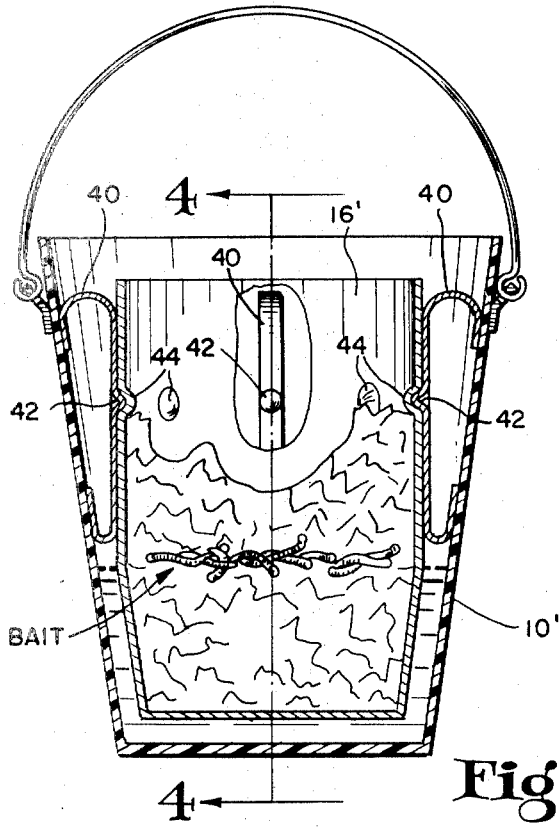
Fig. 3
Fig. 4
INVENTOR
LEON C. DE CROES
BY
Trask, Jenkins & Hanley
ATTORNEYS 3,517,453
BAIT BUCKET
Leon C. De Croes, 319 E. Walnut, Kokomo, Ind. 46901
Filed Jan. 19, 1968, Ser. No. 699,234
Int. Cl. A01k 97/04
U.S. Cl. 43—55
6 Claims

ABSTRACT OF THE DISCLOSURE

A generally cylindrical bait container is supported partially submerged in water in an outer bucket having its side and bottom walls spaced from the container. The support is by a coil spring band attached at four spaced points about the bucket wall to form a square having sides shorter than the diameter of the container. The spring resiliently engages a groove in the wall of the container, which is thereby held in spaced relation with the bucket. The container holds two equal layers of crushed damp newspaper which fills two-thirds of its volume. The bait is placed between the two layers of paper where it is kept alive and clean in the damp environment which is cooled by the surrounding water.

BACKGROUND OF THE INVENTION

Despite many prior proposals, there is still a need for a convenient way for fishermen to keep live bait such as night crawlers alive over a considerable period of time. Accordingly, it is an object of this invention to provide a bait bucket especially adapted for the storage of night crawlers; which bucket is highly effective in keeping the night crawlers alive and clean, and which is easy to manufacture and convenient to use.

SUMMARY OF THE INVENTION

In accordance with the invention, I provide a bait container which is supported in a quantity of water held in an outer bucket. The bait container holds two layers of damp resilient material between which the bait is stored.

In particular, the outer pail is provided with spring means along its inner walls for engaging the outer walls of the bait container to prevent relative movement of the container with respect to the bucket.

Preferably, the spring means comprises an elongated coil spring which is joined at its ends and stretched between four equally spaced points on the inner walls of the bucket to define a square. The bait container is provided with a groove in its outer wall which is engaged by the spring to support the container in its desired position. The groove is desirably one third of the way from the top of the container, both for good stability and to define the fill height for the container.

One layer of damp resilient material, such as crushed newspaper, is disposed in the bottom one-third of the inner container and a second layer of such material is placed in the middle one-third of the container. The walls of the upper one-third of the inner container are kept dry and are either vertical or slanted inwardly toward the top to prevent the escape of any night crawlers.

Other forms of spring means may be used which resiliently grip the sides of the container. For example, an alternative spring means may comprise a plurality of strips of spring material attached to the inner walls of the bucket and bowed toward the center to grip the container. The vertical position of the container may be determined by cooperating protrusions and detents in the strips and in the container walls.

The container is pressed downward into engagement with the spring means and is held in place by its pressure against the sides of the container. The container is thereby held at the proper depth in the water in the bucket.

BRIEF DESCRIPTION OF THE DRAWINGS

The accompanying drawing illustrates the invention. In such drawing:

FIG. 1 is a vertical sectional view of one embodiment of my invention;

FIG. 2 is a sectional view taken on the line 2—2 of FIG. 1, and showing a coil spring container support;

FIG. 3 is a sectional side elevation of a modification, showing leaf spring container supports; and FIG. 4 is a sectional view taken on the line 4—4 of FIG. 3, and showing in dotted lines the position of one of the leaf springs when it is in an unsprung condition.

DETAILED DESCRIPTION OF THE PREFERRED EMBODIMENT

The bait bucket shown in FIGS. 1 and 2, comprises an outer bucket 10 formed of plastic, metal, wood or the like, and having a handle 12 retained by brackets 14 attached to the sides of the bucket. An inner container 16 is received within the bucket and is removably supported with its side and bottom walls spaced from the corresponding walls of the bucket. The container 16 is supported and is held against relative movement with respect to the bucket 10 by spring means attached to the bucket and engaging spring retaining means on the inner container 16. The spring means comprises a coil spring 18 joined together at its ends and held in a square configuration by four equally spaced eyelets 20 on the inner wall of the bucket 10. Thus, the spring forms a chordal portion 21 between each adjacent pair of eyelets. The lower portion of the inner container 16 is tapered, as shown at 22, so that it may be received easily within the square formed by the spring 18. A pair of outwardly protruding ribs 24 are formed in the side walls of the container at a position about one-third of the way from its top, which define a groove 26 to receive the spring 18. Alternatively, the groove 26 may be formed by a single concave deformation in the container wall.

Two layers 28 and 30 of damp resilient material, such as crushed newspaper, are held within the container 16 and the bait is stored between the layers, each of which takes up a third of the volume of the inner container. The upper one-third of the container side wall is vertical and is normally dry, which prevents the escape of the bait.

A line or other marker such as another ridge 32 is applied to the outer wall of the inner container at a point about one-third of the way from its bottom side, and water 34 is placed in the bucket to cover the entire lower portion of the inner container up to this mark.

Bait such as night crawlers may be conveniently stored between the layers of newspaper 28 and 30, and it will be kept alive by the dampness of the paper, and will be kept cool by the water 34 contacting the outer walls of the inner container 16. Crushed newspaper is convenient and effective to use, and is readily replaceable to maintain a fresh and clean bait bed.

In the modification of my invention shown in FIGS. 3 and 4, the device is substantially identical with that of FIGS. 1 and 2 except for the spring means which comprises strips of spring material 40 which are attached at their ends to the bucket 10' so that the mid-portion of the strip springs 40 are caused to bow toward the center of the outer bucket 10'. The dotted lines in FIG. 4 show the bowed position of one of the springs 40 when the container 16' is removed from the bucket. The inner container 16' when inserted between the springs causes them to deflect and to exert pressure against the inner container. Each strip spring 40 has an inward protrusion 42, and the container has corresponding detents 44 or a groove for receiving the protrusions to prevent vertical movement of the container with respect to the bucket.

In both embodiments the bait container is supported by the spring means against downward movement as would be caused by gravitational forces, and against upward movement urged by buoyant forces of the water, so that the container is held at the proper depth within the outer bucket.

I claim:

1. A bucket for storing bait, comprising an outer bucket adapted to receive water, a bait container, means to support the bait container within the outer bucket and to maintain the outer walls of the container in a spaced relation from the inner walls of the outer bucket, said means to support the bait container being formed by a coil spring joined at its ends and attached at a plurality of points about the inner circumference of the bucket thereby providing an opening defined by a plurality of chordal spring portions within the bucket, said container being positioned in said opening and having its side walls engaged by said chordal spring portions.

2. The bucket as set forth in claim 1, wherein the container has a groove in its side walls to receive the chordal portions of the spring.

3. The bucket as set forth in claim 2 further comprising two layers of damp resilient material held within the container, the bait being stored between said layers.

4. A bucket for storing bait, comprising an outer bucket adapted to receive water, a bait container, means to support the bait container within the outer bucket and to maintain the outer walls of the container in a spaced relation from the inner walls of the outer bucket, said means to support the bait container being formed by a plurality of strips of spring material attached at their ends to the bucket, said strips having their center portions bowed toward the center of the bucket, said container being positioned in the center of the bucket and having its side walls in engagement with the bowed strips.

5. The bucket as set forth in claim 4, wherein said strips are provided with protrusions at their engagements with the container, and wherein the container wall is formed to receive said protrusions to thereby position the container within the outer bucket.

6. The bucket as set forth in claim 5, further comprising two layers of damp resilient material held within the container, the bait being stored between said layers.

References Cited

UNITED STATES PATENTS

| | | | |
|---|---|---|---|
| 30,303 | 10/1860 | Doolittle et al. | 62—457 |
| 1,023,531 | 4/1912 | Shafer. | |
| 2,591,578 | 4/1952 | McNealy et al. | 220—17 X |
| 2,885,819 | 5/1959 | Newell et al. | 43—55 |
| 3,236,001 | 2/1966 | Keiter | 43—55 |

HUGH R. CHAMBLEE, Primary Examiner